United States Patent [19]

Nagase et al.

[11] 4,295,084
[45] Oct. 13, 1981

[54] CONTROL APPARATUS OF SYNCHRONOUS MOTOR HAVING THYRISTOR CONVERTER

[75] Inventors: Hiroshi Nagase, Hitachi; Toshiaki Okuyama, Tokaimura; Yuzuru Kubota, Hitachi; Katsunori Suzuki, Takahagi, all of Japan

[73] Assignee: Hitachi, Ltd., Tokyo, Japan

[21] Appl. No.: 45,849

[22] Filed: Jun. 5, 1979

[30] Foreign Application Priority Data

Jun. 5, 1978 [JP] Japan ................................ 53-66701

[51] Int. Cl.³ .......................................... H02P 5/40
[52] U.S. Cl. .................................. 318/719; 318/721
[58] Field of Search ............... 318/716, 717, 719, 720, 318/721, 722, 723, 739, 740, 748

[56] References Cited

U.S. PATENT DOCUMENTS

| 3,588,645 | 6/1971 | Gilmore | 318/717 X |
|---|---|---|---|
| 3,636,425 | 1/1972 | Dickinson et al. | 318/739 X |
| 4,058,755 | 11/1977 | Honbu et al. | 318/700 X |
| 4,060,753 | 11/1977 | Okuyama et al. | 318/700 |
| 4,088,932 | 5/1978 | Okuyama et al. | 318/721 X |
| 4,093,898 | 6/1978 | Morters et al. | 318/740 |
| 4,125,796 | 11/1978 | Nagase et al. | 318/716 X |

Primary Examiner—J. V. Truhe
Assistant Examiner—Richard M. Moose
Attorney, Agent, or Firm—Craig and Antonelli

[57] ABSTRACT

A control apparatus of a synchronous motor having armature windings and perpendicular field windings comprises a frequency converter of a cycloconverter which converts the frequency of an alternating current and supplies the converted current to the armature windings of the synchronous motor. On a shaft of the synchronous motor are installed a speed detector, a position detector, and a speed instruction circuit. The frequency converter is controlled in accordance with the outputs of the speed detector, the position detector and the speed instruction circuit. An alternating current excites the field windings, so that a field of magnetic force is rotationally generated. The direction of the magnetic field is determined depending upon the output of the speed detector.

8 Claims, 14 Drawing Figures

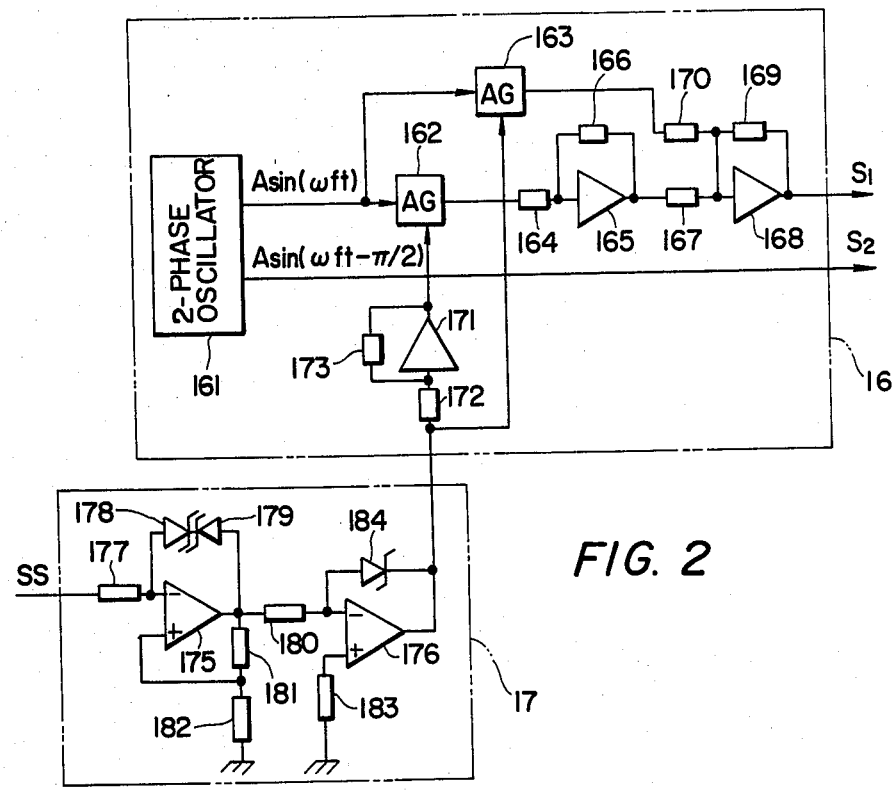
FIG. 2
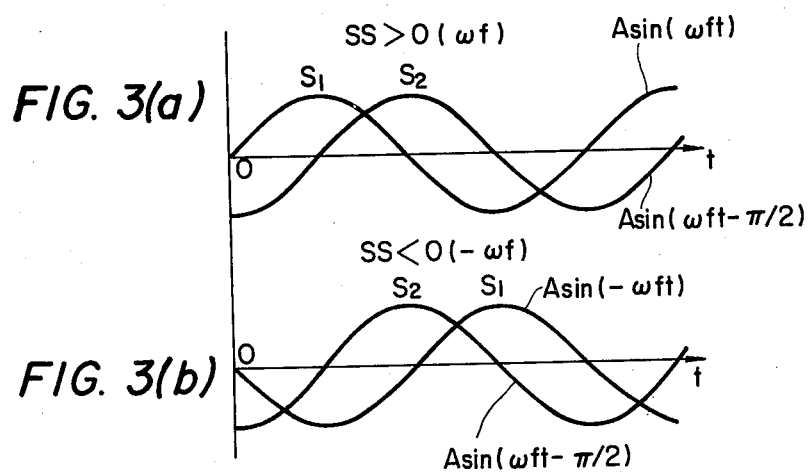
FIG. 3(a)
FIG. 3(b)

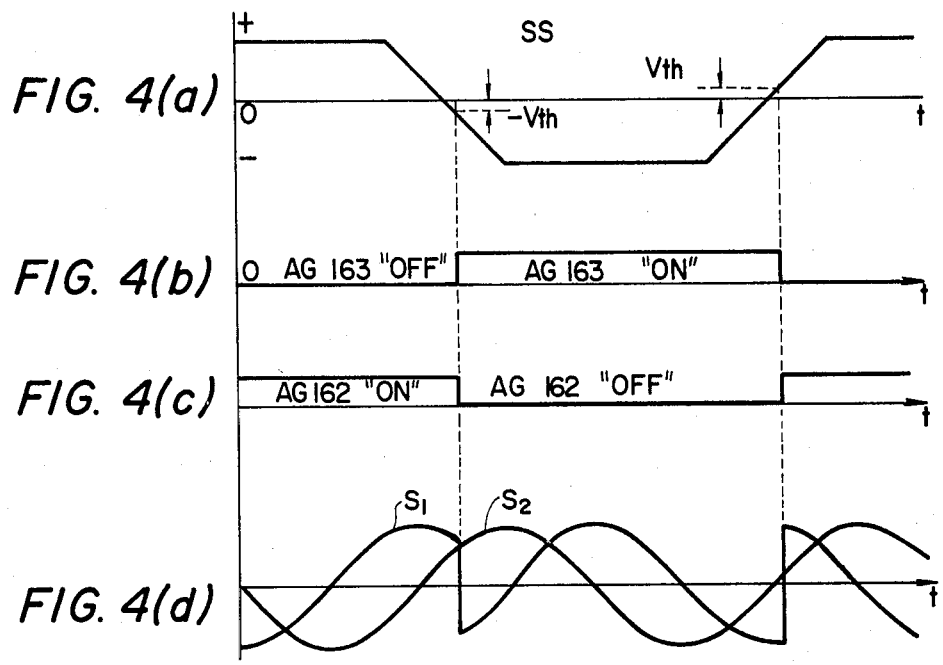
FIG. 4(a)
FIG. 4(b)
FIG. 4(c)
FIG. 4(d)
FIG. 5
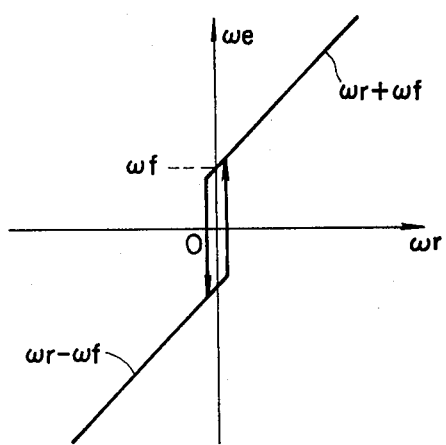

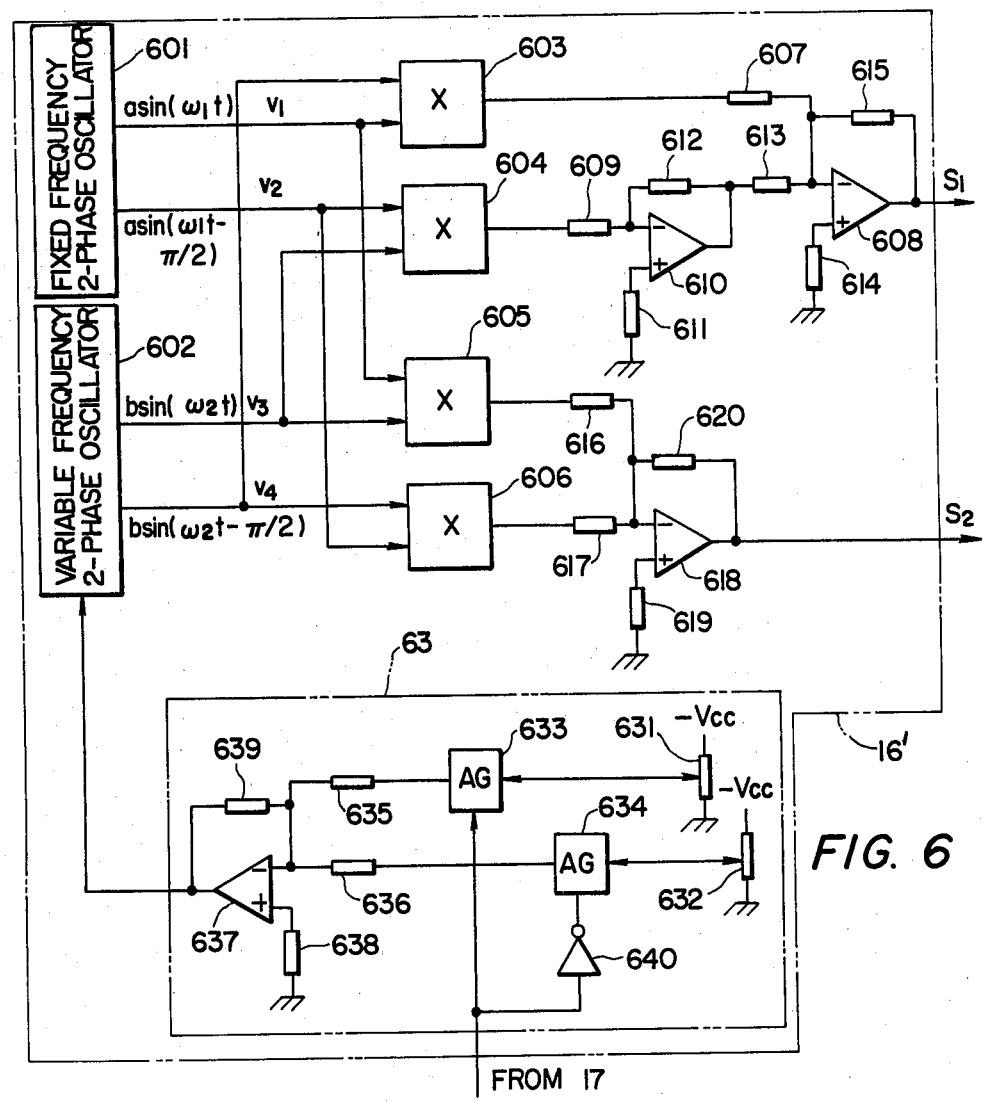
FIG. 6
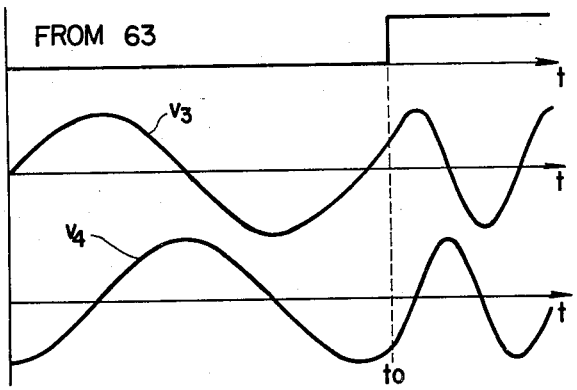
FIG. 7(a)
FIG. 7(b)
FIG. 7(c)

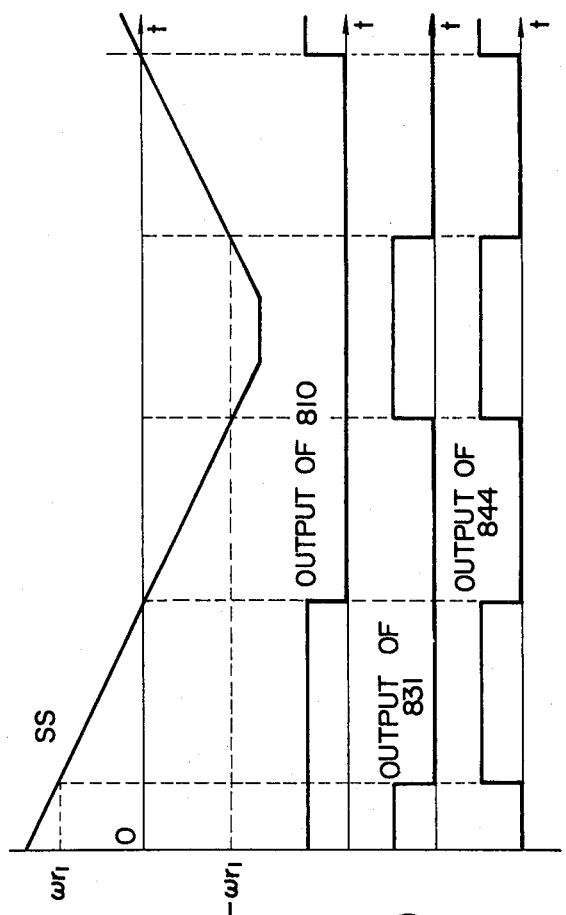

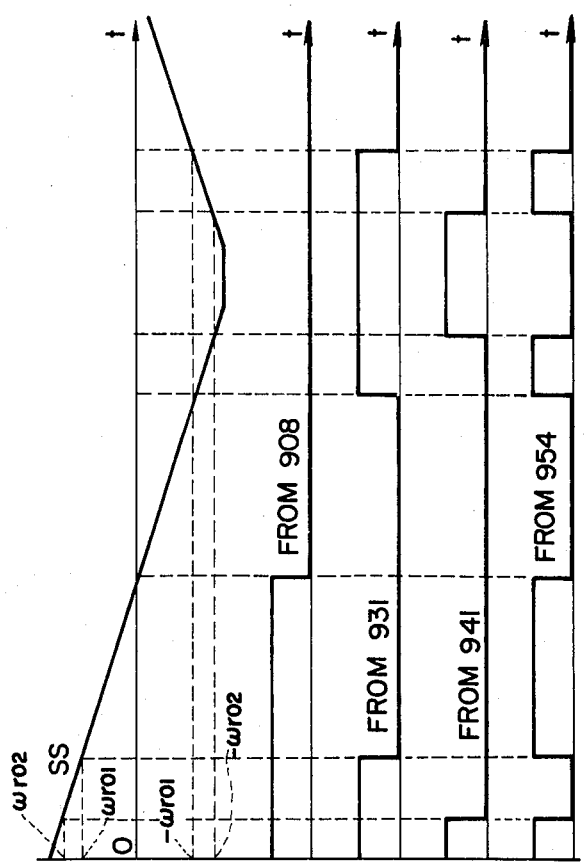

CONTROL APPARATUS OF SYNCHRONOUS MOTOR HAVING THYRISTOR CONVERTER

BACKGROUND OF THE INVENTION

The present invention relates to a synchronous motor which is controlled by a thyristor converter, and more particularly to a control apparatus employing a thyristor for controlling commutatorless motors.

In recent years, thyristor motors or commutatorless motors have been widely employed for driving heavy loads such as rolling mills. In the rolling mills, for instance, the driving motors are often required to produce large torque even while they are rotating at speeds near zero or at very slow speeds, and are further required to be continuously controlled. Under such conditions, however, since an alternating current supplied to an armature is zero or near zero in frequency and is scarcely commuted over the thyristors alternately, the electric current tends to be concentrated on any one of the thyristors of the converter. This phenomenon is called "current concentration", and is described in detail in U.S. Pat. No. 4,060,753 which is issued on Nov. 29, 1977 and assigned to Hitachi, Ltd. This phenomenon causes the junction portion of the thyristor to generate heat so that the junction portion is finally broken down. To cope with this current concentration, therefore, all of the thyristor circuits must have $\pi$ times of capacity. Because of this fact, it is necessary to employ a thyristor converter or a cycloconverter circuit having large capacity.

In order to solve the abovementioned drawbacks, a control system has been proposed in the U.S. Pat. No. 4,060,753, in which two field windings are provided perpendicularly intersecting to each other, and not only the armature windings but also the field windings are rotationally excited by an alternating current. If the angular frequency of the field excitation current produced by output signals $S_1$ and $S_2$ of an oscillator is denoted by $\omega_S$, the terminal voltage and armature current will have the angular frequency $\omega_s + \omega_r$, in which $\omega_r$ represents the angular frequency of the rotational speed of the motor. In such a system, when the rotational speed is zero ($\omega_r = 0$), the armature current has the frequency $\omega_s$. Therefore, the current concentration can be prevented.

However, the abovementioned system presents the following drawback when it is applied to the motor which is designed to rotate in both directions. Namely, when the motor is required to rotate at a speed $-\omega_s$, i.e., at a speed $\omega_s$ in the reverse direction, the frequency of the armature current becomes zero. Therefore, the current concentration occurs in the converter circuit. Otherwise, the current concentration occurs when the motor rotates at the speed $\omega_s$ with the armature current being controlled with the angular frequency $\omega_r - \omega_s$.

SUMMARY OF THE INVENTION

An object of the present invention, therefore, is to provide a control apparatus for controlling a thyristor or commutatorless motor which can rotate in both directions without presenting the abovementioned current concentration in the converter.

The above object of the present invention is achieved by a control apparatus of a synchronous motor, in which two field windings are rotationally excited by an alternating current, and means are provided to determine the direction of the rotating magnetic field generated by the field windings depending upon an output of an actual speed detecting means which detects the actual rotating speed of the synchronous motor.

BRIEF DESCRIPTION OF THE DRAWINGS

FIG. 2 is a schematic diagram showing, in detail, an oscillation circuit and a frequency instruction circuit of FIG. 1;

Figure 1:
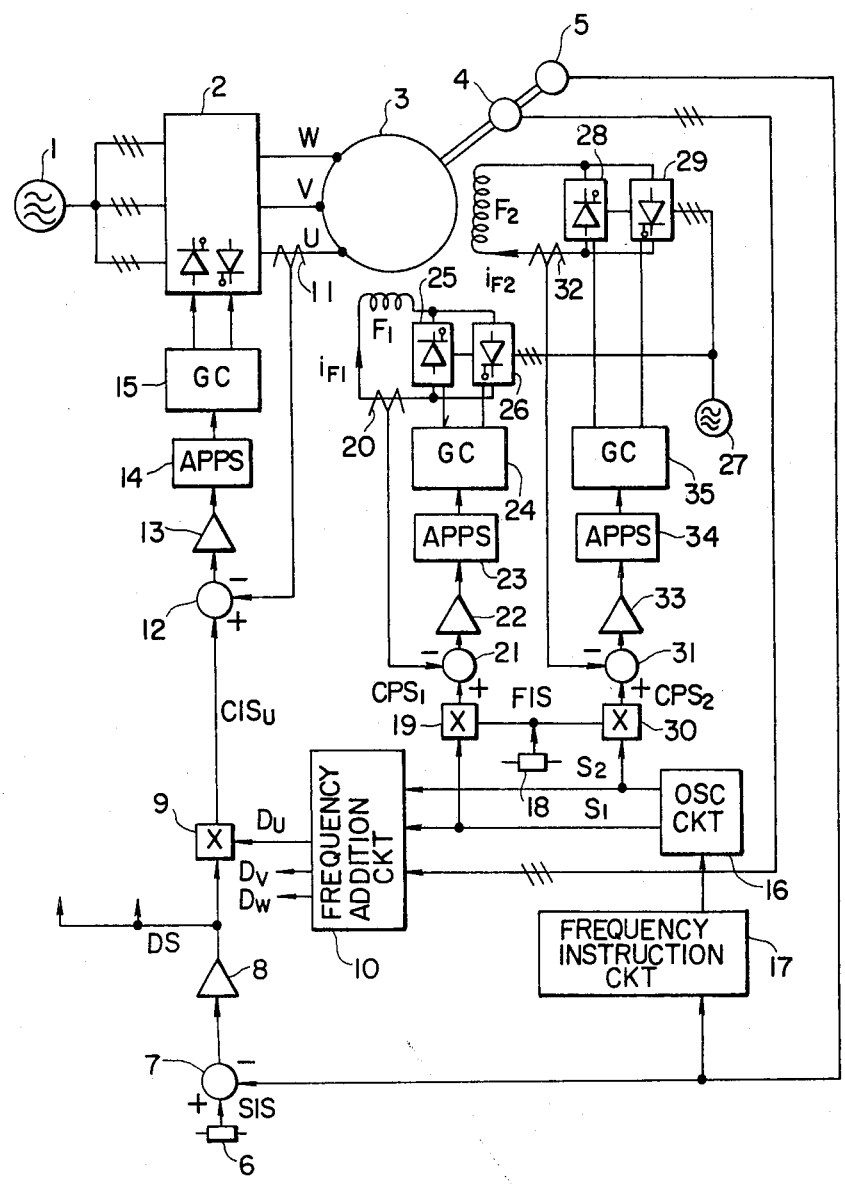
FIG. 1 is a schematic diagram showing a control apparatus according to an embodiment of the present invention.
Figure 8A:
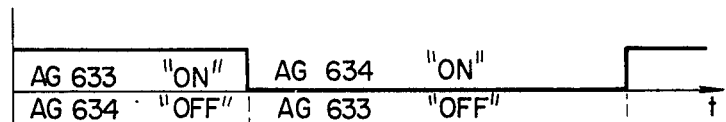
Figure 8B:
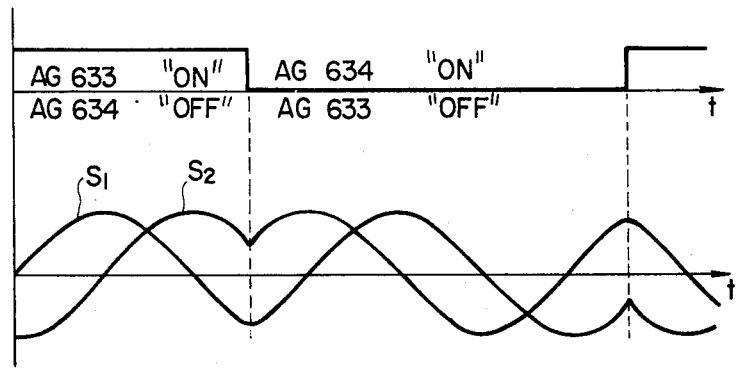
Figure 11:
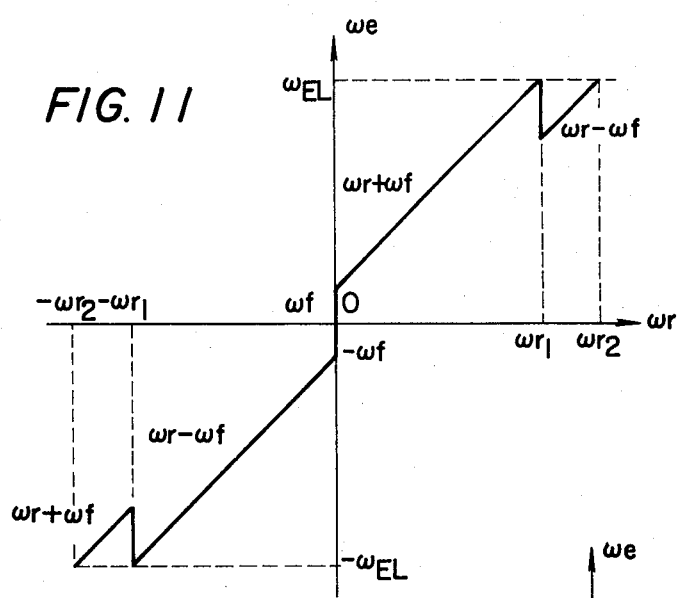
Figure 14:
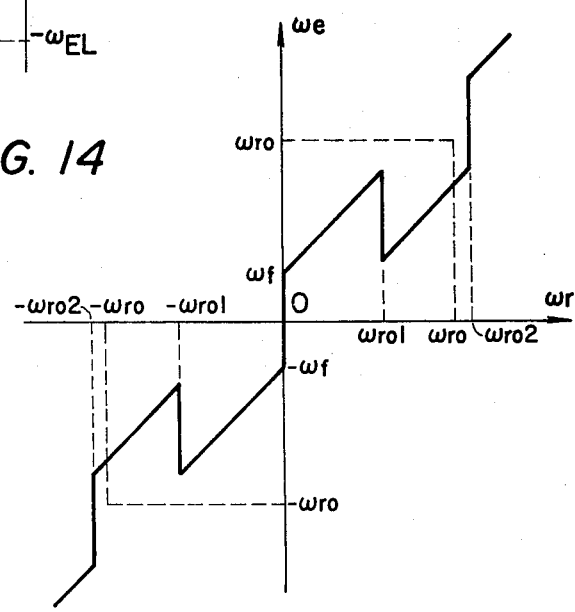
Figure 9:
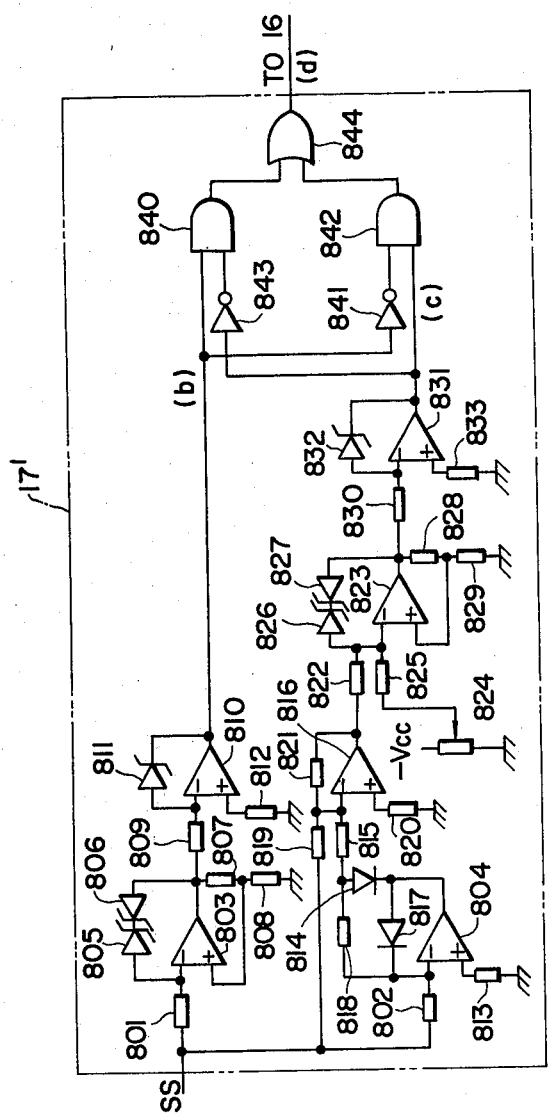
Figure 12:
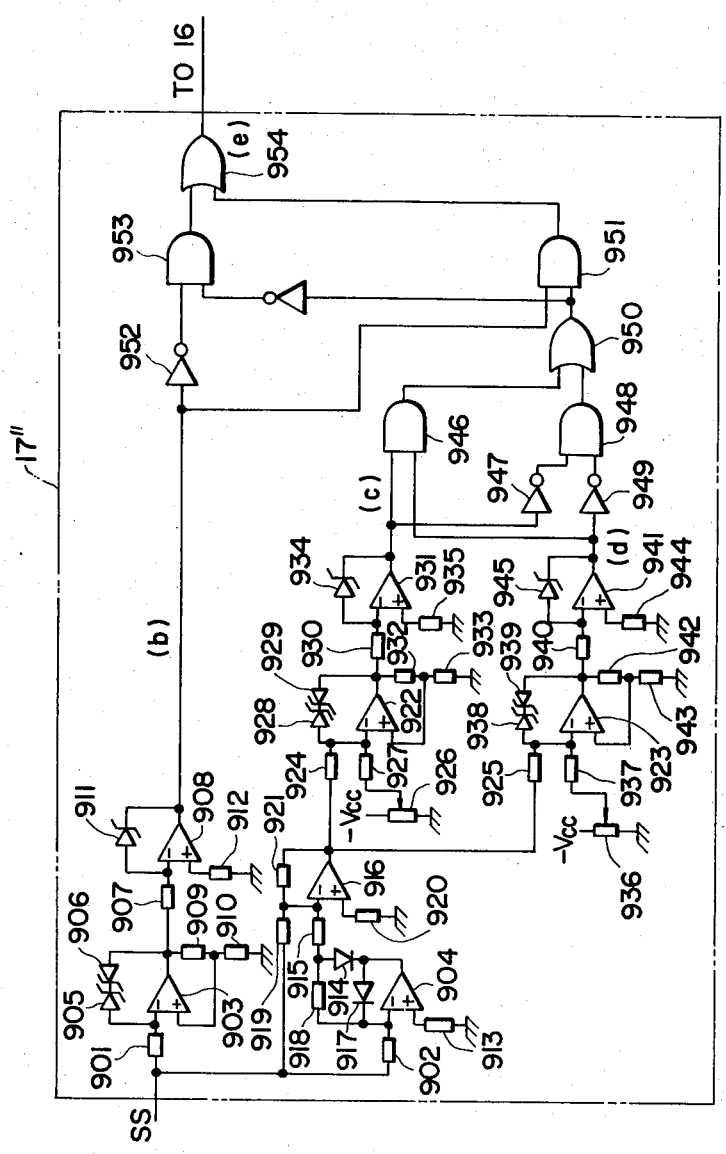

Diagrams (a) and (b) of FIG. 3 are graphs of output waveforms described to illustrate the two output signals of the oscillation circuit which is shown in detail in FIG. 2;

Diagrams (a) to (d) of FIG. 4 are graphs showing output waveforms at various portions, which are described to illustrate the operation of the control apparatus of the present invention diagramatized in FIGS. 1 and 2;

FIG. 5 is a graph to show the control characteristics of the control apparatus of the present invention shown in FIGS. 1 and 2;

FIG. 6 is a schematic diagram showing a modified embodiment of the oscillation circuit of FIG. 1;

FIG. 7 is a graph showing the output waveforms of a variable-frequency two-phase oscillator constituting the oscillation circuit of FIG. 6;

Diagrams (a) and (b) of FIG. 8 are graphs showing output waveforms at various portions described to illustrate the operation of the oscillation circuit of FIG. 6;

FIG. 9 is a schematic diagram showing a modified embodiment of the frequency instruction circuit of FIG. 1;

Diagrams (a) to (d) of FIG. 10 are graphs showing output waveforms at various portions described to illustrate the operation of the frequency instruction circuit of FIG. 9;

FIG. 11 is a graph showing the control characteristics of a control apparatus to which is applied the frequency instruction circuit of FIG. 9;

FIG. 12 is a schematic diagram showing another modified embodiment of the frequency instruction circuit of FIG. 1;

Diagrams (a) to (e) of FIG. 13 are graphs showing output waveforms at various portions described to illustrate the operation of the another modified embodiment of the frequency instruction circuit of FIG. 12; and FIG. 14 is a graph showing the control characteristics of a control apparatus to which is applied the frequency instruction circuit of FIG. 12.

DETAILED DESCRIPTION OF THE PREFERRED EMBODIMENTS

Referring to FIG. 1, a three-phase alternating current from an alternating current power supply 1 is supplied to a synchronous motor 3 via a cycloconverter 2. As is well known among those skilled in the art, the cycloconverter 2 consists of three sets of thyristor-bridge circuits which are connected in anti-parallel with each other and it converts the frequency of the three-phase alternating current from the alternating current power supply 1 into any desired frequency. The synchronous motor 3 driven by the cycloconverter 2 has three-phase armature windings U, V and W, as well as two field windings $F_1$ and $F_2$ for producing magnetomotive forces that meet at right angles with each other. On a rotary shaft of the synchronous motor 3 are installed a position detector 4 which produces three sine-wave signals $P_U$, $P_V$ and $P_W$ having a phase angle of 120° with respect to each other at phases corresponding to the rotating angles of the rotary shaft, and a speed detector 5 which detects the rotating speed of the synchronous motor 3. The speed detector 5 consists, for example, of a tachometer generator, and produces voltage signals SS of either the positive polarity or the negative polarity depending upon the rotating direction of the rotary shaft.

A speed instruction circuit 6 composed of a potentiometer generates speed instruction signals SIS. A comparator 7 receives through its positive input terminal and negative input terminal a speed instruction signal SIS produced by the speed instruction circuit 6 and a speed signal SS produced by the speed detector 5, and produces a signal DS corresponding to the difference between the above two signals. The signal DS is fed, via a speed-difference amplifier 8, to a multiplier 9 which controls the thyristor-bridge circuit of the phase U of the cycloconverter 2. The adder 7 and the speed-difference amplifier 8 constitute a speed control circuit.

The multiplier 9 multiplies the abovementioned difference signal DS by an output signal $D_U$ among the three output signals of a frequency adder circuit 10 which will be mentioned later, and produces a current instruction signal $CIS_U$ of a sinusoidal waveform for controlling the output current of the phase U of the cycloconverter 2. The current instruction signal $CIS_U$ from the multiplier 9 and an output signal from a current detector 11 are applied to a positive input terminal and to a negative input terminal of a comparator 12, respectively, whereby a signal corresponding to the difference between the two signals is produced on the output terminal of the comparator 12. This output is fed to a current instruction amplifier 13 which forms a current control circuit together with the comparator 12. Upon receipt of the output signal from the current control circuit, an automatic pulse phase shifter 14 controls a thyristor igniting phase of the thyristor-bridge circuit of the phase U of the cycloconverter 2, whereby a gate circuit 15 alternately gives gate signals to the thyristor-bridge circuit in the positive direction and to the thyristor-bridge circuit in the negative direction responsive to the direction of the output current in the phase U of the cycloconverter 2. Although the drawing shows only the control circuit for the phase U of the cycloconverter 2, the same control circuits have also been provided for other phases V and W. Their description, however, is omitted here.

Now a field winding control circuit for exciting the two crossing field windings $F_1$ and $F_2$ of the synchronous motor 3 will be discussed. An oscillation circuit 16 produces two signals $S_1$ and $S_2$ having a phase difference of 90° with respect to each other at an angular velocity or frequency of $\omega_f$. These signals $S_1$ and $S_2$ control the field currents supplied to the field windings $F_1$ and $F_2$, and the rotating direction of the rotating magnetic field produced by the field windings $F_1$ and $F_2$ is determined by the output of a frequency instruction circuit 17. When the synchronous motor is rotating in the forward direction, the frequency instruction circuit 17 produces a frequency instruction of $+\omega_f$, and when the synchronous motor is rotating in the reverse direction, the frequency instruction circuit produces a frequency instruction of $-\omega_f$. This will be discussed later in detail.

A field current instruction circuit 18 consists, for example, of a potentiometer, and generates a field current instruction signal FIS for instructing as to the magnitude of the field current. A multiplier 19 multiplies a field current instruction signal FIS by a signal $S_1$ from the oscillation circuit 16 to produce an output signal of a sinusoidal waveform. The output signal serves as a current-pattern signal $CPS_1$ of a field current $i_{F1}$. A current detector 20 detects the actual intensity of the current $i_{F1}$ supplied to the field windings. A comparator 21 constituting the current control circuit together with an amplifier 22 receives the current-pattern signal $CPS_1$ and an output of the current detector 20, and produces an output signal corresponding to the difference between the two signals to an automatic pulse phase shifter 23. The automatic pulse phase shifter 23 controls the thyristor igniting phases of the thyristor-bridge circuits 25 and 26 via a gate circuit 24 which supplies the gate signal from the automatic pulse phase shifter 23 to the thyristor-bridge circuit 25 or 26 depending upon the direction of the field current $i_{F1}$. These thyristor-bridge circuits 25 and 26 have been connected in anti-parallel with each other to convert the three-phase alternating current from the alternating current power supply 27 into an alternating current which will be supplied to the field winding $F_1$. The thyristor-bridge circuits 28 and 29 which are supplying the alternating current to the other field winding $F_2$ have also been constructed in the same manner as the abovementioned thyristor circuit with the exception that they have been controlled by the signals $S_2$ from the oscillation circuit 16. That is, the thyristor-bridge circuits 28 and 29 produce a current-pattern signal $CPS_2$ upon receipt of a field current instruction signal FIS of a multiplier 30, and the output $S_2$ of the oscillation circuit 16. A comparator 31 produces an output signal corresponding to the difference between the current-pattern signal $CPS_2$ and output signal from a current detector 32 which detects a field current $i_{F2}$; the thus produced signal is fed to an automatic pulse phase shifter 34 via an amplifier 33. A gate signal from the automatic pulse phase shifter 34 is fed to a thyristor-bridge circuit 28 or 29 via a gate circuit 35. The thyristor-bridge circuits 28 and 29 have been connected in anti-parallel with each other to convert the three-phase alternating current from the alternating current power supply 27 into an alternating current which will be supplied to the field winding $F_2$.

The two signals $S_1$ and $S_2$ of the oscillation circuit 16 are also fed to the frequency adder 10 which receives three-phase position signals $P_U$, $P_V$ and $P_W$ from the position detector 4 to produce output signals $D_V$ and $D_W$ to control circuits (not shown) of phases V and W of the cycloconverter 2 which supplies the alternating current to the armature windings of the synchronous motor 3.

As shown in FIG. 2, the oscillation circuit 16 has a two-phase oscillator 161 which produces two output signals $v_1$ and $v_2$ given by the following relations:

$$v_1 = A \sin(\omega_f t) \tag{1}$$

$$v_2 = A \sin(\omega_f t - \pi/2) \tag{2}$$

where A represents an amplitude of the sine wave signals, and $\omega_f$ represents a frequency of the field currents $i_{F1}$ and $i_{F2}$, i.e., an angular velocity of the rotary magnetic field.

As will be obvious from the relations (1) and (2) above, the output signals v₁ and v₂ have a phase difference of $\pi/2$ with respect to each other.

One output signal v₁ of the two-phase oscillator 161 is introduced into input terminals of two analog gates 162 and 163, and other output signal v₂ is directly fed to an external unit as the signal S₂. These analog gates 162 and 163 are rendered conductive when the control signal is of the high level and are rendered nonconductive when the control signal is of the low level. The output terminal of the analog gate 162 is connected to an input of an operational amplifier (OP amplifier) through an input resistor 164. The OP amplifier 165 has a feedback resistor 166. The output of the OP amplifier 165 is connected to an input of an OP amplifier 168 through an input resistor 167. The OP amplifier 168 also has a feedback resistor 169 which is inserted between an output terminal and an input terminal thereof. To the input terminal of the OP amplifier 168 is connected the output terminal of the analog gate 163 via an input resistor 170. The output of the OP amplifier 168 is fed to an external unit as the signal S₁. The two OP amplifiers 165 and 168 work as inverters.

To the control input of the analog gate 162 is fed an output signal of the frequency instruction circuit 17 via an inverter composed of an OP amplifier 171, an input resistor 172 therefor, and a feedback resistor 173, and to the control input of the analog gate 163 is directly fed the output signal of the frequency instruction circuit 17.

The frequency instruction circuit 17 consists of an OP amplifier 175 constituting a hysteresis comparator, and an OP amplifier 176 constituting an inverter. To the input terminal of the OP amplifier 175 is applied, via an input resistor 177, a speed signal SS from the speed detector 5. Between the output terminal and the negative input terminal of the OP amplifier 175 have been inserted two Zener diodes 178 and 179 which are connected in series and in opposite directions. The OP amplifier 175 gives its output to a negative input of the OP amplifier 176 via an input resistor 180 as well as to resistors 181 and 182 which are connected in series with the ground. A connection point between the resistors 181 and 182 is connected to a positive input of the OP amplifier 175. A positive input of the OP amplifier 176 is grounded via a resistor 183. The output of the OP amplifier 176 serves as a control input to the two analog gates 162 and 163 of the oscillation circuits 16 and is also fed back to a negative input thereof via a Zener diode 184. Therefore, the frequency instruction circuit 17 produces a control signal of the low level, i.e., produces a frequency instruction of $+\omega f$ when the speed signal SS is greater than a negative threshold value of the hysteresis comparator, and produces a control signal of the high level, i.e., produces a frequency instruction of $-\omega f$ when the speed signal SS is smaller than a positive threshold value.

The output waveforms of the abovementioned oscillation circuit 16 are mentioned below with reference to the diagrams (a) and (b) of FIG. 3. When the rotating speed of the synchronous motor, i.e., when the output signal SS from the speed detector 5 is of a positive value, or more strictly, when the output signal SS is greater than the negative threshold value $-Vth$ of the hysteresis comparator of the frequency instruction circuit 17, the analog gate 162 of the oscillation circuit is rendered conductive and the analog gate 163 is rendered non-conductive, thereby to produce two signals S₁ and S₂ given by the following relations:

$$S_1 = A \sin(\omega ft) \tag{3}$$

$$S_2 = A \sin(\omega ft - \pi/2) \tag{4}$$

That is, the signal S₁ is in advance of the signal S₂ in phase by $\pi/2$, so that the field windings F₁ and F₂ are excited by an alternating current of a frequency $+\omega f$. In other words, the rotating magnetic field rotates at an angular velocity $\omega f$ in the same direction as to the rotating direction of the rotary shaft of the synchronous motor.

On the other hand, when the speed signal SS is of a negative value, or more strictly, when the speed signal SS is smaller than the positive threshold value $+Vth$ of the hysteresis comparator, the analog gate 162 is rendered nonconductive and the analog gate 163 is rendered conductive, thereby to produce two signals S₁ and S₂ given by the following relations:

$$S_1 = A \sin(=\omega ft) = A \sin(\omega ft = \pi) \tag{5}$$

$$S_2 = A \sin(\omega ft - \pi/2) \tag{6}$$

As shown in the diagram (b) of FIG. 3, the phase of the signal S₁ lags behind the signal S₂ by $\pi/2$, so that the field windings F₁ and F₂ are excited by an alternating current of a frequency $-\omega f$. That is, the rotating magnetic field rotates in the direction opposite to that of the abovementioned example.

The operation of the embodiment of the present invention is mentioned below with reference to FIG. 4. As shown in the diagram (a) of FIG. 4, the speed detector 5 produces a speed signal SS in proportion to the running speed of the synchronous motor. When the speed signal SS which is decreasing with the decrease in the running speed of the synchronous motor is still greater than the negative threshold value of the hysteresis comparator of the frequency instruction circuit 17, the output signal of the frequency instruction circuit 17 acquires the low level. Therefore, as shown in the diagrams (b) and (c) of FIG. 4, the analog gate 162 of the oscillation circuit 16 is rendered conductive, and the analog gate 163 is rendered nonconductive, thereby to produce the signals S₁ and S₂ as given by the aforementioned relations (3) and (4). The field currents $i_{F1}$ and $i_{F2}$ supplied to the field windings F₁ and F₂ are controlled depending upon these signals S₁ and S₂. Hence, the field currents $i_{F1}$ and $i_{F2}$ are expressed as follows:

$$i_{F1} = I_F \sin(\omega ft) \tag{7}$$

$$i_{F2} = I_F \sin(\omega ft - \pi/2) \tag{8}$$

where $I_F$ represents a maximum current value of the field currents $i_{F1}$ and $i_{F2}$, and the magnetic field rotates at an angular velocity $+\omega f$.

In this case, the output currents $i_U$, $i_V$ and $i_W$ of the cycloconverter 2 are so controlled as to become sine wave currents represented by the belowmentioned three relations and are supplied to the phases U, V and W of the armature.

$$i_U = I_M \sin[(\omega\gamma + \omega f)t] \tag{9}$$

$$i_V = I_M \sin[(\omega\gamma + \omega f)t - \tfrac{2}{3}\pi] \tag{10}$$

$$i_W = I_M \sin[(\omega\gamma + \omega f)t - 4/3\pi] \tag{11}$$

where $I_M$ represents a maximum amplitude of the armature currents $i_U$, $i_V$ and $i_W$, and $\omega\gamma$ represents a rotating frequency or an angular velocity of the synchronous motor.

As will be obvious from the above relations, while the field is rotating at the angular velocity $+\omega\gamma$, the armature currents $i_U$, $i_V$ and $i_W$ are controlled at an angular velocity $(\omega\gamma + \omega f)$. As a result, even when the synchronous motor came into halt ($\omega\gamma = 0$), the angular velocity of the armature currents, i.e., the output frequency $\omega e$ ($=\omega\gamma + \omega f$) of the cycloconverter becomes greater than the angular velocity $\omega f$ of the field currents $i_{F1}$ and $i_{F2}$, making it possible to prevent the electric current from being concentrated.

As the speed signal SS is further decreased to become smaller than the negative theshold value $-V_{th}$ of the hysteresis comparator, the frequency instruction circuit 17 produces an output signal of the high level, whereby the analog gate 162 of the oscillation circuit 16 is rendered nonconductive and the analog gate 163 is rendered conductive. Accordingly, the oscillation circuit 16 produces signals $S_1$ and $S_2$ as given by the abovementioned relations (5) and (6), so that the field currents $i_{F1}$ and $i_{F2}$ controlled by these signals $S_1$ and $S_2$ are given by the following relations:

$$i_{F1} = I_F \sin(-\omega ft) = I_F \sin(\omega ft - \pi) \quad (12)$$

$$i_{F2} = I_F \sin(\omega ft - \pi/2) \quad (13)$$

In this case, the output currents $i_U$, $i_V$ and $i_W$ of the cycloconverter 2 are so controlled as to become sine wave currents as given by the following relations:

$$i_U = I_M \sin[(\omega\gamma - \omega f)t] \quad (14)$$

$$i_V = I_M \sin[(\omega\gamma - \omega f)t - \tfrac{2}{3}\pi] \quad (15)$$

$$i_W = I_M \sin[(\omega\gamma - \omega f)t - 4/3\pi] \quad (16)$$

At this moment, since the angular velocity $\omega\gamma$ is smaller than zero ($\omega\gamma < 0$), the absolute value of the angular velocity or frequency $\omega e$ ($=\omega\gamma - \omega f$) of the output of the cycloconverter 2 becomes greater than the rotating speed $\omega f$ of the field, making it possible to prevent the current concentration.

The frequency adder circuit 10 which determines the frequency or angular speed of the output currents $i_U$, $i_V$ and $i_W$ of the cycloconverter, the output signals $D_U$, $D_V$ and $D_W$ of the frequency adder circuit 10, and the operation of the circuit for controlling the cycloconverter, have been already mentioned in detail in U.S. Pat. No. 4,060,753, and their description is omitted here.

FIG. 5 shows a relation between the angular velocity $\omega\gamma$ of the synchronous machine and the angular velocity $\omega e$ of the output of the cycloconverter according to the aforementioned embodiment of the present invention. As will be obvious from FIG. 5, by converting the angular velocity $\omega e$ of the output of the cycloconverter into the sum or difference of the angular velocity $\omega\gamma$ of the synchronous motor and the angular velocity $\omega f$ of the rotary field depending upon the angular velocity $\omega\gamma$ of the synchronous motor, the absolute value of the angular velocity of the output of the cycloconverter becomes greater than the absolute value of the angular velocity of the rotary field throughout the whole speed range of the synchronous motor ($|\omega e| \geq |\omega f|$), making it possible to prevent the current concentration.

FIG. 6 shows another embodiment of the oscillation circuit. In FIG. 6, an oscillation circuit 16' has a fixed frequency two-phase oscillator 601 for producing two signals of fixed frequencies, and a variable frequency two-phase oscillator 602 for producing two signals having variable frequencies. The output signals $v_1$ to $v_4$ from these oscillators are given by the following relations:

$$v_1 = a \sin(\omega_1 t) \quad (17)$$

$$v_2 = a \sin(\omega_1 t - \pi/2) \quad (18)$$

$$v_3 = b \sin(\omega_2 t) \quad (19)$$

$$v_4 = b \sin(\omega_2 t - \pi/2) \quad (20)$$

where a and b represent amplitudes of the signals $v_1$, $v_2$, $v_3$ and $v_4$, $\omega_1$ and $\omega_2$ represent angular velocities, the angular velocity $\omega_1$ being fixed and the angular velocity $\omega_2$ being variable.

Among these four output signals $v_1$ to $v_4$ produced by these two oscillators 601 and 602, the signals $v_1$ and $v_4$ are fed to a first multiplier 603, the signals $v_2$ and $v_3$ are fed to a second multiplier 604, the signals $v_3$ and $v_1$ are fed to a third multiplier 605, and the signals $v_4$ and $v_2$ are fed to a fourth multiplier 606. The output of the first multiplier 603 is fed to a negative input of an OP amplifier 608 via an input resistor 607, and the output of the second multiplier 604 is fed to a negative input of an OP amplifier 610 via an input resistor 609. A positive input of the OP amplifier 610 is grounded through a resistor 611, a feedback resistor 612 is inserted between the output and the negative input of the OP amplifier 610, and the output of the OP amplifier 610 is fed to the negative input of the abovementioned OP amplifier 608 through an input resistor 613. A positive input of the OP amplifier 608 is also grounded via a resistor 614, a feedback resistor 615 is inserted between the output and the negative input of the OP amplifier 608, and the output of the OP amplifier 608 is fed to an external unit as a signal $S_1$.

The outputs of the third and fourth multipliers 605 and 606 are fed to the negative input of the OP amplifier 618 via input resistors 616 and 617. The positive input of the OP amplifier 618 is grounded through a resistor 619, and a feedback resistor 620 is inserted between the output and a negative input of the OP amplifier 618. The OP amplifier 618 produces a signal $S_2$.

Responsive to instruction signals of a variable frequency instruction circuit 63, the variable frequency two-phase oscillator 602 varies the frequencies of the output signals $v_3$ and $v_4$. The variable frequency instruction circuit 63 has two voltage setting devices 631 and 632 each consisting of a potentiometer. The outputs of the voltage setting devices 631 and 632 are fed to the input terminals of analog gates 613 and 634. The output terminals of these analog gates 633 and 634 are connected to a negative input of an OP amplifier 637 via input resistors 635 and 636. The OP amplifier 637 has a resistor 638 through which its positive input is grounded, and a feedback resistor 639 which is inserted between the output and the negative input thereof, and produces an output as an instruction signal to the variable frequency two-phase oscillator 602. To a control input of the analog gate 633 has been fed an output signal of the frequency instruction circuit 17 which was already mentioned in detail, and to a control input of another analog gate 634 is fed an output signal from the frequency instruction circuit 17 through an inverter 640.

FIG. 7 shows output characteristics of the variable frequency two-phase oscillator 602. The diagram (a) shows an instruction signal from the frequency instruction circuit 63, and the diagrams (b) and (c) show two output signals $v_3$ and $v_4$ from the variable frequency two-phase oscillator 602. The two output signals $v_3$ and $v_4$ of the sinusoidal waveforms from the variable frequency two-phase oscillator 602 instantaneously change their frequencies when an instruction signal is changed from the low level into the high level at a given moment ($t=t_0$), and still retain their continuity.

The operation of the oscillation circuit 16' is mentioned below. Upon receipt of the output signal $v_1$ from the fixed frequency two-phase oscillator 601 and the output signal $v_4$ from the variable frequency two-phase oscillator 602, the multiplier 603 performs the following operation to produce an output $k_1$:

$$k_1 = a \sin(\omega_1 t) \times b \sin(\omega_2 t - \pi/2) \quad (21)$$

Upon receipt of the output signals $v_2$ and $v_3$, on the other hand, the multiplier 604 performs the following operation to produce an output $k_2$:

$$k_2 = a \sin(\omega_1 t - \pi/2) \times b \sin(\omega_2 t) \quad (22)$$

Therefore, the OP amplifier 608 produces a signal $S_1$ given by the following relation:

$$S_1 = -k_1 + k_2 = a \cdot b \sin[(\omega_1 - \omega_2)t] \quad (23)$$

The output signal $l_1$ of the multiplier 605, the output signal $l_2$ of the multiplier 606, and the output signal $S_2$ of the OP amplifier 618, are given by the following relations:

$$l_1 = a \sin(\omega_1 t) \times b \sin(\omega_2 t) \quad (24)$$

$$l_2 = a \sin(\omega_1 t - \pi/2) \times b \sin(\omega_2 t - \pi/2) \quad (25)$$

$$S_2 = -l_1 - l_2 = a \cdot b \sin[(\omega_1 - \omega_2)t - \pi/2] \quad (26)$$

In these equations, if $\omega_1$, $\omega_2$, a and b are so selected that $$\left. \begin{array}{l} \omega_1 - \omega_2 = \omega f \\ a \cdot b = A \end{array} \right\} \quad (27)$$

the output signals $S_1$ and $S_2$ are given as follows:

$$S_1 = A \sin(\omega f t) \quad (28)$$

$$S_2 = A \sin(\omega f t - \pi/2) \quad (29)$$

Namely, to excite the field windings $F_1$ and $F_2$ at an angular velocity plus $\omega f$, the frequency $\omega_2$ of outputs $v_3$ and $v_4$ of the variable frequency two-phase oscillator 602 should be controlled as follows:

$$\omega_2 = \omega_1 - \omega f \quad (30)$$

To rotate the rotary field at an angular velocity $-\omega f$, on the other hand, the frequency $\omega_2$ should be controlled as follows:

$$\omega_2 = \omega_1 + \omega f \quad (31)$$

The abovementioned control is performed by way of the abovementioned variable frequency instruction circuit 63. That is, as shown in the diagram (a) of FIG. 8, when the output signal from the frequency instruction circuit 17 is of the high level, the analog gate 633 is rendered conductive and the analog gate 634 nonconductive. Hence, the output of the voltage setting device 631 is fed to the variable frequency two-phase oscillator 602 via the OP amplifier 637, and the two-phase oscillator 602 produces an output of the frequency $\omega_2$ as given by the above equation (30). As a result, the signal $S_1$ advances ahead of the signal $S_1$ in phase by $\pi/2$, as shown in the diagram (b) of FIG. 8.

Then when the output signal from the frequency instruction circuit 17 is of the low level, the analog gate 633 is rendered nonconductive and the analog gate 634 conductive. Hence, the output of the voltage setting device 632 is fed to the variable frequency two-phase oscillator 602 via the OP amplifier 637. Consequently, the signal $S_1$ lags in phase behind the signal $S_2$ by $\pi/2$.

As will be obvious from FIG. 8, using the abovementioned oscillation circuit 16' producing output signals $S_1$ and $S_2$ which change continuously, the magnitudes of exciting currents fed to the field windings $F_1$ and $F_2$ are continously changed but are never abruptly changed even when the output from the frequency instruction circuit 17 is changed. Therefore, the synchronous motor produces continuous and smooth torque.

FIG. 9 shows a further embodiment of the frequency instruction circuit for determining the phases of output signals $S_1$ and $S_2$ of the oscillation circuit 16, i.e., for determining the currents $i_{F1}$ and $i_{F2}$ fed to the field windings $F_1$ and $F_2$ responsive to the speed signals SS from the speed detector 5. The speed signal SS is fed to negative input terminals of OP amplifiers 803 and 804 via input resistors 801 and 802. The OP amplifier 803 has two Zener diodes 605 and 606 which are connected in series but in opposite directions between the output terminal and the negative input terminal thereof, and its output is fed to a negative input terminal of an OP amplifier 810 via an input resistor 809 and is further grounded via two series resistors 807 and 808. The contacting point between the two resistors 807 and 808 connected in series is connected to a positive input terminal of the OP amplifier 803 thereby to constitute a hysteresis comparator. A zener diode 811 is inserted between the output terminal and the negative input terminal of the OP amplifier 810, and the positive input terminal of the OP amplifier 810 is grounded via a resistor 812.

A positive input terminal of an OP amplifier 804 is grounded via a resistor 813, and the output thereof is fed to a negative input terminal of an OP amplifier 816 via a reverse diode 814 and a resistor 815. Between the output terminal and the negative input terminal of the OP amplifier 804 are inserted a forward diode 817, as well as a resistor 818 connected in parallel with two diodes 814 and 817 which are connected in series. The speed signal SS from the speed detector 5 is fed to a negative input terminal of the OP amplifier 816 via a resistor 819, and a positive input of the OP amplifier 816 is grounded via a resistor 820. A feedback resistor 821 has been inserted between the output terminal and the negative input terminal of the OP amplifier 816. These two OP amplifiers 804 and 816 constitute an absolute value circuit which produces an output proportional to the absolute value of the speed signal SS, whereby a resistance $R_{10}$ of the resistor 815 has been so selected as to be one-half of the resistance of the resistors 802, 818, 819, and 821.

The output of the OP amplifier 816 constituting the absolute value circuit is introduced to a negative input terminal of the OP amplifier 823 through a resistor 822. To the negative input terminal of the OP amplifier 823 has further been applied an output of a voltage setting device 824 via a resistor 825. Two Zener diodes 826 and 827 which are connected in series but in opposite directions are inserted between the output and the negative input of the OP amplifier 823. The output of the OP amplifier 823 is grounded via resistors 828 and 829 which are connected in series, and a connection point of these resistors 828 and 829 is connected to the positive input of the OP amplifier 823 thereby to constitute a hysteresis comparator. The output of the OP amplifier 823 is fed to a negative input of an OP amplifier 831 via an input resistor 830. A reverse Zener diode 832 is inserted between the output and the negative input of the OP amplifier 831, and the positive input of the OP amplifier 831 is grounded via a resistor 833. With the thus constructed frequency instruction circuit, the voltage setting device 824 has been so adjusted as to produce an output corresponding to the rotating speed $\omega\gamma_1$, and the hysteresis comparator made up of the OP amplifier 823 discriminates whether the speed signal SS is greater than the rotating speed $\omega\gamma_1$ or not.

The output of the OP amplifier 810, on one hand, is directly fed to an input of an AND gate 840, and is, on the other hand, fed to an input of another AND gate 842 via an inverter 841. The output of the OP amplifier 831, on one hand, is directly fed to another input of the AND gate 842, and is, on the other hand, fed to another input of the AND gate 840 via an inverter 843. The outputs of these two AND gates 840 and 842 are fed to the oscillation circuit 16 via an OR gate.

The operation of the thus constructed frequency instruction circuit 17' is mentioned below with reference to FIG. 10. As shown in the diagrams (a) and (b) of FIG. 10, the output of the OP amplifier 810 acquires the high level when the rotating speed of the synchronous motor, i.e., when the speed signal SS is greater than the rotating speed $\omega\gamma_1$ (SS>$\omega\gamma_1$). At this moment, the output of the OP amplifier 831 acquires the high level as shown in the diagram (c) of FIG. 10, and the output of the OR gate 844 acquires the low level as shown in the diagram (d) of FIG. 10, such that the output signal $S_1$ of the oscillation circuit advances ahead of the signal $S_2$ by $\pi/2$. Namely, the field rotates at the angular velocity $\omega f$ in the direction opposite to the rotating direction of the rotary shaft, and the frequency, i.e., the angular velocity of the armature current is so controlled as will be equal to a difference ($\omega\gamma-\omega f$) between an actual rotating speed $\omega\gamma$ and the angular velocity $\omega f$ of the rotating field.

When the speed signal SS is decreased to be smaller than the above rotating speed $\omega\gamma_1$ ($\omega\gamma_1$>SS>0), the OP amplifier 831 changes its output from the high level into the low level. Therefore, the output of the OR gate 844 is changed from the low level into the high level, the output signal $S_1$ of the oscillation circuit 16 is lagged behind the signal $S_2$ by $\pi/2$, and the rotating direction of the field becomes the same direction as the rotating direction of the rotary shaft. At this moment, the frequency, i.e., the angular velocity of the armature current fed to the armature windings is so controlled as will be equal to the sum ($\omega\gamma+\omega f$) of an actual angular velocity $\omega\gamma$ and the angular velocity $\omega f$ of the rotating field.

As the speed signal SS is further reduced to become smaller than zero, or strictly speaking, as the speed signal SS decreases to become smaller than the negative threshold value -Vth of the hysteresis comparator (SS<0), the output of the OP amplifier 810 is changed from the high level to the low level, and the output of the OR gate 844 acquires the low level. Accordingly, the, the signal $S_1$ advances ahead of the signal $S_2$ by $\pi/2$. Since the rotary shaft has been rotating in the reverse direction, the rotating direction of the rotary shaft is in agreement with the rotating direction of the field. Here, the angular velocity of the armature current is so controlled as will be equal to the value ($\omega\gamma-\omega f$). This state is continued until the speed signal SS is further reduced to become smaller than a preset rotating speed $-\omega\gamma_1$, and the output of the OR gate 844 acquires the high level.

FIG. 11 shows a relation between a rotating speed $\omega\gamma$ of the synchronous motor when the frequency instruction circuit 17' is applied to the control circuit and the output of the cycloconverter, i.e., the angular velocity $\omega e$ of the armature current. As will be obvious from FIG. 11, when there is a limit ($\pm\omega_{EL}$) in the output frequency $\omega e$ of the cycloconverter, the controllable speed range can further be expanded ($\omega\gamma_1$ to $\omega\gamma_2$) by adjusting the angular velocity of the armature current, i.e., by adjusting the output frequency $\omega e$ of the cycloconverter to be equal to the sum or the difference of the rotating speed of the synchronous motor and the angular velocity of the field current.

FIG. 12 shows yet another embodiment of the frequency instruction circuit. The speed signal SS is fed to negative inputs of OP amplifiers 903 and 904 via input resistors 901 and 902, respectively. Two Zener diodes 905 and 906 connected in series and in opposite directions are inserted between the output and negative input terminals of the OP amplifiers 903. The output of the OP amplifier 903 is fed to a negative input of an OP amplifier 908 via an input resistor 907 and is further grounded via two resistors 909 and 910 that are connected in series. The connection point between the two resistors is connected to the positive input of the OP amplifier 903. A Zener diode 911 of opposite direction is inserted between the output and the negative input of the OP amplifier 908, and the positive input of the OP amplifier 908 is grounded via a resistor 912.

On the other hand, the positive input of the OP amplifier 904 is grounded via a resistor 913, and the output of the OP amplifier 904 is fed to a negative input of an OP amplifier 916 via a reverse diode 914 and a resistor 915. A diode 917 is inserted between the output and the negative input of the OP amplifier 904, and a resistor 918 is further connected in parallel with two diodes 914 and 917 that are connected in series. Further, the speed signal SS from the speed detector 5 is fed to the negative input of the OP amplifier 916 via a resistor 919. The positive input of the OP amplifier 916 is grounded via a resistor 920, and feedback resistor 921 is inserted between the output and the negative input of the OP amplifier 916. These OP amplifiers constitute an absolute value circuit in the same manner as mentioned earlier.

The output of the OP amplifier 916 constituting the absolute value circuit is fed to negative input terminals of OP amplifiers 922 and 923 constituting comparators via resistors 924 and 925. The output of a voltage setting device 926 is fed to the negative input of an OP amplifier 922 via a resistor 927. Two diodes 928 and 929 which are connected in series and in opposite directions are inserted between the output terminal and the negative input terminal of the OP amplifier 922. The output of the OP amplifier 922 is fed to a negative input of an OP amplifier 931 via a resistor 930, and is grounded via two resistors 932 and 933 which are connected in series. The connection point of the series resistors is fed back to the positive input of the OP amplifier 922. A Zener diode 934 is inserted between the output terminal and the negative input terminal of the OP amplifier 931, and the positive input terminal of the OP amplifier 931 is grounded via resistor 935. The voltage setting device 926 has been so set that an output corresponding to a rotating speed $\omega\gamma_{01}$ is produced.

To the negative input of the OP amplifier 923 is further fed an output of a voltage setting device 936 via a resistor 937, and two Zener diodes 938 and 939 connected in series but in opposite directions are inserted between the output and the negative input of the OP amplifier 923. The output of the OP amplifier 923 constituting the comparator is fed to a negative input of an OP amplifier 941 via a resistor 940, and is grounded via two series resistors 942 and 943. The connection point between the two resistors 942 and 943 is connected to a positive input of the OP amplifier 923. A positive input of the OP amplifier 941 is grounded via a resistor 944, and a Zener diode 945 has been inserted between the output and the negative input thereof. The voltage setting device 936 has been so set as to produce an output which corresponds to a rotating speed $\omega\gamma_{02}$.

The output of the OP amplifier 931, on one hand, is directly fed to the input of an AND gate 946, and is, on the other hand, fed to an input of an AND gate 948 via an inverter 947. The output of the OP amplifier 941, on one hand, is directly fed to another input of the AND gate 946, and is, on the other hand, fed to another input of the AND gate 948 via an inverter 949. The outputs of these two AND gates 946 and 948 are fed to one input of an AND gate 951 via an OR gate 950, and the output of the OP amplifier 908 is fed to the other input of the AND gate 951. The output of the OP amplifier 908, on the other hand, is fed to one input of an AND gate 953 via an inverter 952. To the other input of the AND gate 953 has also been fed the output of the OR gate 950 via an inverter 954. The outputs of the AND gates 951 and 953 have been fed to the oscillation circuit 16 via the OR gate 954.

The operation of the thus constructed frequency instruction circuit 17″ is mentioned below in conjunction with FIG. 13. As shown in the diagrams (a) to (d) of FIG. 13, when the speed signal SS is greater than a preset rotating speed $\omega\gamma_{02}$ (SS>$\omega\gamma_{02}$), the outputs of the OP amplifiers 908, 931 and 941 acquire the high level, whereby the output of the OR gate 954 acquires the high level as shown in the diagram (e) of FIG. 13; the output signal $S_1$ of the oscillation circuit 16 lags behind the signal $S_2$ in phase by $\pi/2$. That is, the field is rotated at an angular velocity in the same direction as to the rotating direction of the rotary shaft, and the angular velocity of the armature current is controlled by the sum ($\omega\gamma+\omega f$) of an acutal rotating speed $\omega\gamma$ and the angular velocity $\omega f$ of the field.

When the speed signal SS is decreased to be smaller than the above-set rotating speed $\omega\gamma_{02}$>SS>$\omega\gamma_{01}$), the output of the OP amplifier 941 is changed from the high level to the low level as shown in the diagram (d) of FIG. 13. Consequently, the output of the OR gate 954 acquires the low level as shown in the diargam (e) of FIG. 13. Hence, the output signal $S_1$ of the oscillation circuit 16 advances ahead of the signal $S_2$ by $\pi/2$ in phase. At this moment, the angular volocity of the armature current is so controlled as will be equal to the value ($\omega\gamma-\omega f$).

As the speed signal SS is further decreased to become smaller than the preset rotating speed $\omega\gamma_{01}$($\omega\gamma_{01}$>SS>0), the output from the OP amplifier 931 is changed from the high level to the low level as shown in the diagram (c) of FIG. 13, whereby the output of the OR gate 954 acquires again the high level as shown in the diagram (e) of FIG. 31. Therefore, the signal $S_1$ produced by the oscillation circuit 16 is lagged behind the signal $S_2$ by $\pi/2$ in phase and, in this case, the angular velocity of the armature current is so controlled as will be equal to the sum ($\omega\gamma+\omega f$) of the actual rotating speed $\omega\gamma$ and the angular velocity $\omega f$ of the field.

When the speed signal SS is further decreased to be smaller than zero, or strictly speaking, when the speed signal SS is decreased to be smaller than the negative threshold value $-Vth$ of the hysteresis comparator (0>SS>$-\omega\gamma_1$), the output of the OP amplifier 908 acquires the high level, and the output of the OR gate 954 acquires the low level. Consequently, the output signal $S_1$ of the oscillation circuit 16 advances ahead of the signal $S_2$ by $\pi/2$ in phase, and the angular velocity of the armature current is so controlled as will be equal to the value ($\omega\gamma-\omega f$), FIG. 14 shows a relation between the rotating speed $\omega\gamma$ of the synchronous motor when the frequency instruction circuit 17″ is applied to the control circuit and the output of the cycloconverter, i.e., the angular velocity $\omega e$ of the armature current. As will be apparent from FIG. 14, in order to avoid the interference between the mechanical resonance frequency $\omega\gamma_0$ of the synchronous motor and the angular velocity $\omega e$ of the output of the cycloconverter, the angular velocity $\omega e$ of the output of the cycloconverter is controlled by selecting either the sum or the difference of the rotating speed $\omega\gamma$ and the angular velocity $\omega f$ of the rotating field, depending upon the running speed of the synchronous motor. It is therefore made possible to prevent the angular velocity $\omega e$ of the output of the cycloconverter from coming into agreement with the mechanical resonance frequency $\omega\gamma_0$.

What is claimed is:

1. A control apparatus of a synchronous motor having armature windings and perpendicular field windings, and a rotating shaft comprising: a frequency converter composed of thyristors to convert the frequency of an alternating current to supply the converted current to the armature windings of the synchronous motor; means for detecting the actual speed of the synchronous motor; means for detecting a position of the armature relative to the field; means for generating a speed instruction signal; means for rotationally exciting the field windings with alternating current; means for controlling the direction of the rotating magnetic field generated by the field windings which are excited with the alternating current, wherein the direction of the rotating magnetic field is controlled in accordance with the rotating direction of the rotary shaft of the synchronous motor as determined from the output of said actual speed detecting means; and means for controlling said frequency converter to regulate the amplitude of the converted current fed to the armature windings in accordance with a value proportional to a deviation between the speed instruction signal and the output of said speed detecting means and to regulate the frequency of the converted current in accordance with a sum of the output frequency of said position detecting means and the frequency of the alternating current to the field windings.

2. A control apparatus as claimed in claim 1, wherein said magnetic field direction controlling means comprises means for generating current-pattern signals for field current, and means for controlling the phase differences of these pattern signals depending upon the output of said actual speed detecting means.

3. A control apparatus as claimed in claim 2, wherein two current-pattern signals are generated by said current-pattern signal generator, said two signals being different by 90° in phase with respect to each other.

4. A control apparatus as claimed in claim 2, wherein said phase difference determining means comprises a comparator which compares the output of said actual speed detecting means with zero.

5. A control apparatus as claimed in claim 4, wherein said phase difference determining means further comprises a second comparator which compares the output of said actual speed detecting means with a predetermined value.

6. A control apparatus as claimed in claim 1, wherein the means for controlling the direction of the rotating magnetic field generated by said field windings comprises:
an oscillator coupled to said field coils for providing respective control signals to each field coil such that the direction of the rotating magnetic field is determined by the phase relationship between the respective control signals; and
frequency instruction means coupled to the oscillator for controlling the phase relationship between the respective control signals in accordance with the rotational direction of the rotating shaft as determined by the polarity of the output signal of the actual speed detecting means.

7. A control apparatus as claimed in claim 6, wherein said respective control signals comprise a pair of control signals $S_1$ and $S_2$ which have a relative phase difference of 90° with respect to one another.

8. A control apparatus as claimed in claim 7, wherein said frequency instruction means comprises means for setting the control signal $S_1$ to lead the control signal $S_2$ by 90° if the rotating shaft is rotating in a first direction and for setting the control signal $S_1$ to lag the control signal $S_2$ by 90° if the rotating shaft is rotating in a second direction opposite to said first direction.

* * * * *